(12) United States Patent
Foos et al.

(10) Patent No.: US 7,404,928 B2
(45) Date of Patent: Jul. 29, 2008

(54) THIOL TERMINATED MONODISPERSE ETHYLENE OXIDE OLIGOMER CAPPED GOLD NANOCLUSTERS

(75) Inventors: Edward E Foos, Alexandria, VA (US); Arthur W Snow, Alexandria, VA (US)

(73) Assignee: The United States of America as represented by the secretary of the Navy, Washington, DC (US)

( * ) Notice: Subject to any disclaimer, the term of this patent is extended or adjusted under 35 U.S.C. 154(b) by 1036 days.

(21) Appl. No.: 10/206,431

(22) Filed: Jul. 29, 2002

(65) Prior Publication Data

US 2004/0018633 A1 Jan. 29, 2004

(51) Int. Cl.
*G01N 27/12* (2006.01)
*G01N 33/553* (2006.01)

(52) U.S. Cl. .............. 422/82.02; 422/82.01; 422/82.03; 436/149; 436/151; 436/183; 436/524; 436/525

(58) Field of Classification Search ................. 436/149, 436/151, 183, 524–525; 422/82.01–82.03; 556/113; 568/61–62
See application file for complete search history.

(56) References Cited

U.S. PATENT DOCUMENTS

| | | | | | |
|---|---|---|---|---|---|
| 4,565,854 | A | * | 1/1986 | Sato et al. | 526/214 |
| 5,194,651 | A | * | 3/1993 | Ramezanian | 558/46 |
| 6,025,202 | A | | 2/2000 | Natan | |
| 6,221,673 | B1 | | 4/2001 | Snow et al. | |
| 2002/0192814 | A1 | * | 12/2002 | Tamarkin et al. | 435/320.1 |

FOREIGN PATENT DOCUMENTS

| | | |
|---|---|---|
| EP | 88105830.9 | 9/1992 |
| GB | 2049669 | * 12/1980 |

OTHER PUBLICATIONS

Hostetler, M. J. et al, Journal of the American Chemical Society 1996, 118, 4212-4213.*
Van Breeman, A. J. J. M. et al, Magentic Resonance in Chemistry 2000, 38, 129-134.*
Nicol, E. et al, Polymer Bulletin 2001, 46, 37-42.*
Foos, E. E. et al, Chemistry of Materials 2002, 14, 2401-2408.*
Vanderah, D. J. et al, Langmuir 2002,18, 4674-4680.*
Dust, J. M. et al, Macromolecules 1990, 23, 3742-3746.*
Harris, J. et al, Polymer Preprints (American Chemical Society, Division of Polymer Chemistry) 1991, 32, 154-155.*
Nakashima, N. et al, Chemistry Letters 1996, 731-732.*
Ohno, H. et al, Chemistry Letters 1998, 407-408.*
Bernstein, S. et al, Journal of Organic Chemistry 1951, 16, 679-684.*
Stibor, I. et al, Collection of Czechoslovak Chemical Communications 1987, 52, 2057-2060.*
Ouchi, M. et al, Bulletin of the Chemical Society of Japan 1990, 63, 1260-1262.*
Hooper, R. et al, Macromolecules 2001, 34, 931-936.*
CRC Handbook of Chemistry and Physics, 1982, 63$^{rd}$ edition, R. C. Weast et al, Ed., pp. C-293 and C-296.*
Hostetler, M. J. et al, Langmuir 1998, 14, 17-30.*
Venderah, D. J. et al, Langmuir 2000, 16, 6527-6532.*
Vanderah, D. J. et al, Materials Research Society Symposium Proceedings 2002, 724, 69-74 (N4.5.1-N4.5.6).*
Porter, M. D. et al, Journal of the American Chemical Society 1987, 109, 3559-3568.*
Baldwin, W. H. et al, Journal of Physical Chemistry 1969, 73, 3417-3420.*
Olender, R. et al, Journal of Chemical Physics 1995, 102, 7180-7196.*
Zhu, B. et al, Journal of Biomedical Materials Research 2001, 56, 406-416.*
Andrew N. Shipway, Eugenii Katz & Itamar Willner, "Nanoparticle Arrays on Surfaces for Electronic, Optical, and Sensor Applications," CHEMPHYSCHEM, 2000, vol. 1, pp. 18-52.
Dean A. Handley "Colloidal Gold: Principles, Methods, and Applications," 1989, vol. 1, pp. 13-32, M. A. Hayat, ed., Academic Press, Inc.
Mathias Brust, Merryl Walker, Donald Bethell, David J. Schiffrin & Robin Whyman, "Synthesis of Thiol-derivatised Gold Nanoparticles in a Two-phase Liquid-Liquid System," J. Chem. Soc., Chem. Commun., 1994, pp. 801-802.
Daniel V. Leff, Lutz Brandt & James R. Heath, "Synthesis and Characterization of Hydrophobic, Oragnically-Soluble Gold Nanocrystals Functionalized with Primary Amines," Langmuir, 1996, vol. 12, pp. 4723-4730.
Gunter Schmid, "Metal Clusters and Cluster Metals," Polyhedron, 1988, vol. 7, No. 22/23, pp. 2321-2329.
Walter W. Weare, Scott M. Reed, Marvin G. Warner & James E. Hutchison, "Improved Synthesis of Small (dCORE = 1.5nm) Phosphine-Stabilized Gold Nanoparticles," J. Am. Chem. Soc., 2000, vol. 122, pp. 12890-12891.
Katherine C. Grabar, R. Griffith Freeman, Michael B. Hommer & Michael J. Natan, "Preparation and Characterization of Au Colloid Monolayers," Anal. Chem. 1995, vol. 67, pp. 735-743.
Marvin G. Warner, Scott M. Reed & James E. Hutchison, "Small, Water-Soluble, Ligand-Stabilized Gold Nanoparticles Synthesized by Interfacial Ligand Exchange Reactions," Chem. Mater., 2000, vol. 12, pp. 3316-3320.
Sihai Chen & Keisaku Kimura, "Synthesis and Characterization of Carboxylate-Modified Gold Nanoparticle Powders Dispersible in Water," Langmuir, 1999, vol. 15, pp. 1075-1082.
Hank Wohltjen & Arthur W. Snow, "Colloidal Metal-Insulator-Metal Ensemble Chemiresistor Sensor," Analytical Chemistry, 1998, vol. 70, No. 14, pp. 2856-2859.
N. Cioffi, I. Losito, L. Torsi, I. Farella, A. Valentini, L. Sabbatini, P. G. Zambonin & T. Bleve-Zavheo, Chem. Mater., 2002, vol. 14, pp. 804-811.

(Continued)

*Primary Examiner*—Arlen Soderquist
(74) *Attorney, Agent, or Firm*—John J. Karasek; Joseph T. Grunkemeyer

(57) ABSTRACT

A thiol terminated ethylene oxide oligomer and the method of substituting the oligomer onto a gold nanocluster surface using a thiol-exchange reaction to form a charge-neutral, non-ionizable, water soluble, ethylene oxide protected gold nanocluster. The thiol terminated ethylene oxide oligomer has the formula $CH_3(OCH_2CH_2)_xSH$ where x varies from one to ten. Also disclosed is the related method of making the thiol terminated ethylene oxide oligomer.

14 Claims, No Drawings

OTHER PUBLICATIONS

Li Han, David R. Daniel, Mathew M. Maye & Chuan-Jian Zhong, "Core-Shell Nanostructured Nanoparticle Films as Chemically Sensitive Interfaces," Anal. Chem., 2001, vol. 73, pp. 4441-4449.

Andrew N. Shipway, Michal Lahav, Ron Blonder & Itamar Willner, "Bis-Bipyridinium Cyclophane Receptor—Au Nanoparticle Superstructures for Electrochemical Sensing Applications," Chem. Mater., 1999, vol. 11, pp. 13-15.

Andrei B. Kharitonov, Andrew N. Shipway & Itamar Willner, "An Au Nanoparticle/Bisbipyridinium, Cyclophane-Functionalized Ion-Sensitive Field-Effect Transistor for the Sensing of Adrenaline," Anal. Chem., 1999, vol. 71, pp. 5441-5443.

Michal Lahav, Rachel Gabai, Andrew N. Shipway & Itamar Willner, "Au-colloid-'molecular square' superstructures: novel electrochemical sensing interfaces," Chem. Commun., 1999, pp. 1937-1938.

Michal Lahav, Andrew N. Shipway & Itamar Willner, "Au-nanoparticle—bis-bipyridinium cyclophane superstructures: assmebly, characterization and sensoric applications," J. Chem. Soc., Perkin Trans. 2, 1999, pp. 1925-1931.

Michal Lahav, Andrew N. Shipway, Itamar Willner, Mogens B. Nielsen & J. Fraser Stoddart, "An enlarged bis-bipyridinium cyclophane-Au nanoparticle superstructure for selective electrochemical sensing applications," Journal of Electroanalytical Chemistry, 2000, vol. 482, pp. 217-221.

Agnes Labande & Didier Astruc, "Colloids as redox sensors: recognition of H2P04- and HSO4- by amidoferrocenylaklylthiol-gold nanoparticles," Chem. Commun., 2000, pp. 1007-1008.

So-Jung Park, T. Andrew Taton & Chad A. Mirkin, Array-Based Electrical Detection of DNA with Nanoparticle Probes, Science, 2002, vol. 295, pp. 1503-1506.

Stephen D. Evans, Simon R. Johnson, Yaling L. Cheng & Tiehan Shen, "Vapour sensing using hybrid organic-inorganic nanostructured materials," J. Mater. Chem., 2000, vol. 10, pp. 183-188.

Qing-Yun Cai & Edward T. Zellers, "Dual-Chemiresistor GC Detector Employing Monolayer-Protected Metal Nanocluster Interfaces," Anal. Chem. 2002, vol. 24, pp. 3533-3539.

W. Peter Wuelfing, Stephen M. Gross, Deon T. Miles & Royce W. Murray, "Nanometer Gold Clusters Protected by Surface-Bound Monolayers of Thiolated Poly(ethylene glycol) Polymer Electrolyte," J. Am. Chem. Soc., 1998, vol. 120, pp. 12696-12697.

Daniel V. Leff, Pamela C. Ohara, James R. Heath & William M. Gelbart, "Thermodynamic Control of Gold Nanocrystal Size: Experiment and Theory," J. Phys. Chem., 1995, vol. 99, pp. 7036-7041.

Marcus Bartz, Jorg Kuther, Gabriele Nelles, Nicole Weber, Ram Seshadri & Wolfgang Tremel, "Monothiols derived from glycols as agents for stabilizing gold colloids in water: synthesis, self-assembly and use as crystallization templates," J. Mater. Chem., 1999, 9, 1121-1125.

Van Breeman et al., "Highly Selective Route for Producing Unsymmetrically Substituted Monomers toward Synthesis of Conjugated Polymers . . . " J. Org. Chem., 1999, 64, 3106-3112.

Nabeshima et al., "Synthesis of a flavin receptor for regulation of ion recognition by assembling components necessary for a binding site" Heterocycles, 41(5), 877-881 (1995).

\* cited by examiner

THIOL TERMINATED MONODISPERSE ETHYLENE OXIDE OLIGOMER CAPPED GOLD NANOCLUSTERS

BACKGROUND

1. Field of the Invention

The present invention relates to thiol terminated compounds and, more specifically, to gold nanoclusters capped with a thiol terminated compound.

2. Description of the Prior Art

The use of thiol terminated molecules for the formation of self-assembled monolayers on gold surfaces is finding increasing use in nanoscale device fabrication. The majority of these uses have focused on long (twelve to eighteen carbon) alkanethiols, which are commercially available and can be used to passivate the gold surface or define lines and patterns on the micro- to nanoscale. While suitable for these basic applications, the lack of reactivity of the alkane chain limits the use of such structures for further assembly or structure fabrication. This has led to the synthesis of new thiols containing functional groups that are at opposite ends of the alkane chain, e.g., α, ω-thiol carboxylic acids. These molecules use the thiol for attachment to the gold surface, exposing the second reactive group for further assembly. Complementary to this approach of chemically altering the ends of the molecule is the possibility of altering the structure of the carbon chain itself from one that is hydrophobic to one that is hydrophilic. The syntheses of such nonionic hydrophilic alkylthiol surfactants could provide very important source materials to use in these self-assembled films and also find application in biotechnology and chemical sensing.

Another useful material configuration of the alkanethiol monolayer-gold combination is the monolayer deposited on a gold nanoparticle. This is referred to as a stabilized nanocluster, and metal nanoclusters of this nature are currently of interest as building blocks for applications in nanoelectronics. The monolayer encapsulated metal nanocluster is a unique material composed of a metal core and an insulating organic shell. As such, it possesses properties of both metals and insulators. These properties are strongly dependent on the dimensions of the core diameter and the shell thickness. Electrical and optical properties are derived from the metal core of the cluster. The larger the core, the higher the electrical conductivity and optical absorbance. The organic shell is composed of a monolayer of ligand molecules bonded to the surface of the metal core. The shell stabilizes the cluster against irreversible aggregation, promotes solubility/processability in a wide variety of solvents, modulates the electrical conductivity by its relative thickness and dielectric constant, and is the region where chemistries of ligand exchange and self-assembly occur. Procedures for the preparation of these clusters from gold salts and both charged and neutral ligand molecules have been described in the following references: U.S. Pat. No. 6,221,673; U.S. Pat. No. 6,025,202; COLLOIDAL GOLD: PRINCIPLES, METHODS, AND APPLICATIONS 1, 13-32 (M. A. Hayat ed., 1989); and Andrew N. Shipway, Eugenii Katz & Itamar Willner, *Nanoparticle Arrays on Surfaces for Electronic, Optical, and Sensor Applications*, CHEMPHYSCHEM 1, 18-52 (2000). In addition to modulation of properties, the design of the ligand molecule determines the processability, hence the utility of the cluster material. Currently, well-known ligand molecules used to stabilize gold clusters include alkanethiols of various chain lengths (Mathias Brust, Merryl Walker, Donald Bethell, David J. Schiffrin & Robin Whyman, *Synthesis of Thiol-derivatised Gold Nanoparticles in a Two-phase Liquid-Liquid System*, J. CHEM. SOC., CHEM. COMMUN. 1994, 801-02), alkylamines of various chain lengths (Daniel V. Leff, Lutz Brandt & James R. Heath, *Synthesis and Characterization of Hydrophobic, Organically-Soluble Gold Nanocrystals Functionalized with Primary Amines*, LANGMUIR 12, 4723-30 (1996)), phosphines (Gunter Schmid, *Metal Clusters and Cluster Metals*, POLYHEDRON 7, 2321-29 (1988); Walter W. Weare, Scott M. Reed, Marvin G. Warner & James E. Hutchison, *Improved Synthesis of Small ($d_{CORE}\approx 1.5$ nm) Phosphine-Stabilized Gold Nanoparticles*, J. AM. CHEM. SOC. 122, 12890-91 (2000)), citrates (Katherine C. Grabar, R. Griffith Freeman, Michael B. Hommer & Michael J. Natan, *Preparation and Characterization of Au Colloid Monolayers*, ANAL. CHEM. 67, 735-43 (1995)), and alkanethiols terminated by ionic or ionizable groups (e.g. sodium sulfonate, carboxylate, etc.) (Marvin G. Warner, Scott M. Reed & James E. Hutchison, *Small, Water-Soluble, Ligand-Stabilized Gold Nanoparticles Synthesized by Interfacial Ligand Exchange Reactions*, CHEM. MATER. 12, 3316-20 (2000); Sihai Chen & Keisaku Kimura, *Synthesis and Characterization of Carboxylate-Modified Gold Nanoparticle Powders Dispersible in Water*, LANGMUIR 15, 1075-82 (1999)).

One area where an opportunity is seen for these nanoclusters to make an impact is chemical sensors owing to the ease of fabrication of such devices, and several examples of nanocluster-based sensors have already been reported. Hank Wohltjen & Arthur W. Snow, *Colloidal Metal-Insulator-Metal Ensemble Chemiresistor Sensor*, ANAL. CHEM. 70, 2856-59 (1998); N. Cioffi, I. Losito, L. Torsi, I. Farella, A. Valentini, L. Sabbatini, P. G. Zambonin & T. Bleve-Zacheo, *Analysis of the Surface Chemical Composition and Morphological Structure of Vapor-Sensing Gold-Fluoropolymer Nanocomposites*, CHEM. MATER. 14, 804-11 (2002); Li Han, David R. Daniel, Mathew M. Maye & Chuan-Jian Zhong, *Core-Shell Nanostructured Nanoparticle Films as Chemically Sensitive Interfaces*, ANAL. CHEM. 73, 4441-49 (2001); Andrew N. Shipway, Michal Lahav, Ron Blonder & Itamar Willner, *Bis-Bipyridinium Cyclophane Receptor—Au Nanoparticle Superstructures for Electrochemical Sensing Applications*, CHEM. MATER. 11, 13-15 (1999); Andrei B. Kharitonov, Andrew N. Shipway & Itamar Willner, *An Au Nanoparticle/Bisbipyridinium Cyclophane-Functionalized Ion-Sensitive Field-Effect Transistor for the Sensing of Adrenaline*, ANAL. CHEM. 71, 5441-43 (1999); Michal Lahav, Rachel Gabai, Andrew N. Shipway & Itamar Willner, *Au-colloid-'molecular square' superstructures: novel electrochemical sensing interfaces*, CHEM. COMMUN. 1999, 1937-38; Michal Lahav, Andrew N. Shipway & Itamar Willner, *Au-nanoparticle-bisbipyridinium cyclophane superstructures: assembly, characterization and sensoric applications*, J. CHEM. SOC., PERKIN TRANS. 2, 1925-31 (1999); Michal Lahav, Andrew N. Shipway, Itamar Willner, Mogens B. Nielsen & J. Fraser Stoddart, *An enlarged bis-bipyridinium cyclophane-Au nanoparticle superstructure for selective electrochemical sensing applications*, J. ELECTROANAL. CHEM. 482, 217-21 (2000); Agnes Labande & Didier Astruc, *Colloids as redox sensors: recognition of $H_2PO_4^-$ and $HSO_4^-$ by amidoferrocenylalkylthiolgold nanoparticles*, CHEM. COMMUN. 2000, 1007-08; So-Jung Park, T. Andrew Taton & Chad A. Mirkin, *Array-Based Electrical Detection of DNA with Nanoparticle Probes*, SCIENCE 295, 1503-06 (2002); Stephen D. Evans, Simon R. Johnson, Yaling L. Cheng & Tiehan Shen, *Vapour sensing using hybrid organic-inorganic nanostructured materials*, J. MATER. CHEM. 10, 183-88 (2000); Qing-Yun Cai & Edward T. Zellers, *Dual-Chemiresistor GC Detector Employing Monolayer-Protected Metal Nanocluster Interfaces*, ANAL. CHEM. 74, 3533-39 (2002). Many of these studies utilize alkanethiol-stabilized clusters, which are readily synthesized in a variety of core and shell sizes, are stable, charge neutral, and able to undergo thiol substitution reactions which facilitate their self-assembly into nanostructures. Despite these advantages, the solubility of such clusters is limited to organic solvents, and it is not difficult to envision situations where aqueous solubility is required, e.g., in DNA based assembly of nanostructures.

Most work involving the use of aqueous gold clusters uses the well-known citrate stabilized gold colloids. These clusters utilize ionic interactions on the cluster surface to obtain solubility, and as a result agglomerate irreversibly on removal of the solvent. They are also larger in size (~12 nm) than the typical alkanethiol stabilized cluster (<2 nm). Reports of water-soluble thiol-coated gold nanoparticles are limited, and most of these clusters are stabilized by an alkanethiol terminating in either an ionic species or a carboxylic acid group. As a result, the aqueous solubility of these clusters is often dependent on the pH of the solution, and the presence of functional groups which can participate in hydrogen bonding between clusters can lead to particle agglomeration. Additionally, the presence of ions in the system leads to interference during conductivity measurements and electron transport studies. Ionic effects are of particular concern in nanoelectronics applications where they can accentuate threshold nonuniformities associated with background charges.

One interesting example of a charge-neutral, non-ionizable water-soluble cluster has been reported where a poly(ethylene glycol) chain was attached to the surface of a gold nanocluster. W. Peter Wuelfing, Stephen M. Gross, Deon T. Miles & Royce W. Murray, *Nanometer Gold Clusters Protected by Surface-Bound Monolayers of Thiolated Poly(ethylene glycol) Polymer Electrolyte*, J. AM. CHEM. SOC. 120, 12696-97 (1998). While this cluster possesses aqueous solubility, the extreme size of the ligand (a polymer of MW=5000) results in an inability for the cluster to undergo thiol-exchange reactions. This is a serious drawback that limits the utility of this material since such reactions are required to perform the self-assembly of clusters onto devices, a necessary step in the further study of these materials as nanoscale building blocks. A second drawback to this material is that it lacks appreciable conductivity without ion doping, limiting its role in a sensor or nanoscale electronic device.

SUMMARY

The aforementioned problems are overcome by the present invention wherein a thiol terminated ethylene oxide oligomer having the formula $CH_3(OCH_2CH_2)_xSH$ is formed and then substituted onto a gold nanocluster surface using a thiol-exchange reaction to form a charge-neutral, non-ionizable, water soluble, ethylene oxide protected gold nanocluster.

In a preferred embodiment, the thiol terminated ethylene oxide oligomer of this invention has the structure $CH_3(OCH_2CH_2)_xSH$, where the value of x varies from one to ten, and is ideally two, three, or four. Another aspect of the present invention is a method for making the thiol terminated ethylene oxide oligomer including the steps of (a) reacting an α-hydroxy-ω-methyl-terminated polyethylene oxide oligomer of appropriate length with an organic sulfonyl halide in an organic solvent in the presence of a base to form a sulfonyl ester; and (b) reacting the sulfonyl ester with thiourea and a base in water followed by neutralization with acid.

Yet another aspect of the present invention is a method of making a charge-neutral, non-ionizable, water-soluble gold nanocluster using a thiol terminated ethylene oxide oligomer by dissolving an alkanethiol encapsulated gold cluster and the thiol terminated ethylene oxide oligomer together in a solvent causing an exchange reaction where a gold core bound alkanethiol ligand is displaced by a thiol terminated ethylene oxide free ligand.

The present invention results in several advantages. The gold nanoclusters made using the thiol terminated ethylene oxide oligomer are easily prepared, small in core size, stable, water-soluble, charge-neutral, and able to undergo thiol-exchange reactions. These gold nanoclusters have important implications for sensors and for nanostructure fabrication in aqueous environments, e.g., in DNA-based assembly.

These and other objects, features, advantages of the invention, as well as the invention itself, will become better understood by reference to the following detailed description and appended claims.

DETAILED DESCRIPTION

The thiol terminated ethylene oxide oligomer of the present invention has the formula $CH_3(OCH_2CH_2)_xSH$, where the value of x varies from one to ten, and is ideally two, three, or four. Routes for the preparation of the thiol terminated ethylene oxide oligomer are depicted in Scheme 1. The lower route is preferred over the upper route in Scheme 1 because it results in higher yields of the intermediate and the end products.

Scheme 1.
Two-step synthesis of thiol terminated ethylene oxide oligomers.

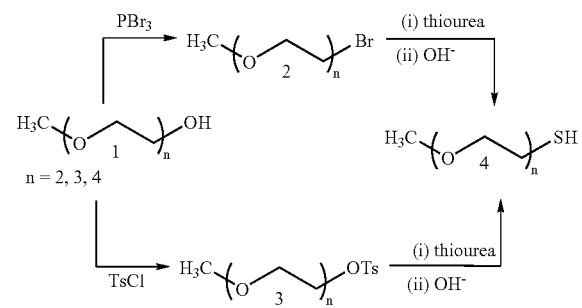

The preferred synthesis is the lower route in Scheme 1, where the thiols are prepared from the reaction of a methyl-terminated polyethylene glycol of appropriate length with an organic sulfonyl halide, preferably p-toluene sulfonyl chloride, in an organic solvent preferably at a temperature near 0° C. (+/−20°) in the presence of a base. The base can be a hydroxide or an amine and is preferably NaOH. After sufficient time has passed for a sulfonyl ester, preferably tosylate, to form, the sulfonyl ester is reacted with thiourea and a base in water or in a water/alcohol mixture, followed by neutralization with acid. The base can be a hydroxide and is preferably NaOH. The reaction of the sulfonyl ester with thiourea is conducted under and controlled by reflux conditions preferably in a temperature range from 50 to 150° C. Following this route, both the intermediate and the thiol product can be isolated in excellent yields with no detectable byproducts and nominal purification efforts. For the case of n=2, the tosylate is isolated in 86% yield by simple extraction and solvent evaporation as a colorless liquid without a spectroscopically detectable impurity. The thiol product can be isolated in 91% yield by vacuum distillation as a colorless liquid without GC or spectroscopically detectable byproduct, giving an overall yield of 78%.

The preferred solvents for the lower route in Scheme 1 are aprotic basic solvents, and more preferably coordinating organic solvents such as tetrahydrofuran, diethyl ether, or pyridine used in combination with the tosylchloride reagent and a base such as sodium hydroxide or pyridine itself in the first step. A mixture of water and an alcohol such as methanol or ethanol used in combination with the sequence of thiourea and sodium hydroxide is preferred for the second step.

The ethylene oxide protected gold clusters of the present invention consist of a plurality of nanoclusters each composed of a gold core with a diameter of 0.5 to 10 nm and encapsulated by a monolayer of the thiol terminated ethylene oxide oligomer bonded to surface gold atoms of the gold core with sulfur-gold bonds. The charge-neutral, non-ionizable, water-soluble gold nanoclusters are prepared by a ligand exchange reaction wherein an alkanethiol encapsulated gold cluster is reacted with an excess of the thiol terminated ethylene oxide oligomer free ligand. The reaction occurs at the gold core surface where the free ligand displaces an initially bound ligand. The degree of exchange depends on the amount of excess free ligand and its relative reactivity toward the gold surface. This degree of exchange may be advanced toward 100% by isolating a partially exchanged product and reacting it in successive steps with freshly added thiol terminated ethylene oxide oligomer free ligand.

A direct synthesis can be used instead of an exchange synthesis. The direct approach involves following the method by which alkanethiol encapsulated gold nanoclusters are synthesized. Mathias Brust, Merryl Walker, Donald Bethell, David J. Schiffrin & Robin Whyman, *Synthesis of Thiol-derivatised Gold Nanoparticles in a Two-phase Liquid-Liquid System*, J. CHEM. SOC., CHEM. COMMUN. 1994, 801-02. In this approach, a toluene-water two-phase system is employed where the alkanethiol free ligand is dissolved in the toluene phase and the gold salt is dissolved in the aqueous phase. A cationic phase transfer agent (e.g. tetraoctylammonium bromide) is added to the gold ion from the aqueous into the toluene phase. A reducing agent (e.g. sodium borohydride) is then added to the aqueous phase with strong agitation so that reduction of the gold ion to neutral gold occurs in the aqueous phase. The reduced gold atoms nucleate into growing nanoparticles. At the same time the alkanethiol ligands start to bond to the particle surface and begin to encapsulate the growing particle. Once the gold particle is encapsulated, particle growth stops, and the size of the gold core of the cluster is fixed. The relative rates of gold particle growth and of bonding of the alkanethiol free ligand determine the size of the gold core obtained. The rate of alkanethiol bonding with the gold particle surface is determined by its reactivity and concentration. Synthetically, this concentration may be varied to regulate the gold core size, and these conditions have been correlated with various gold:alkanethiol stoichiometric ratios. Daniel V. Leff, Pamela C. Ohara, James R. Heath & William M. Gelbart, *Thermodynamic Control of Gold Nanocrystal Size: Experiment and Theory*, J. PHYS. CHEM. 99, 7036-41 (1995). The alkanethiol gold cluster is readily purified from the phase transfer agent and any excess free ligand by taking advantage of a solubility selectivity wherein the alkanethiol gold cluster is precipitated in alcohol while the phase transfer agent and excess free ligand are washed away.

The direct approach will work when the thiol terminated ethylene oxide oligomer is substituted for the alkanethiol as the free ligand. The thiol terminated ethylene oxide oligomer reactivity toward the gold surface is different, making the degree of control on the gold core size an unknown factor. Additionally, the cluster purification is made very difficult by the phase transfer agent and excess free ligand having such similar solubility with the ethylene oxide encapsulated gold cluster that a selective precipitation is not practicable. While other purification methods such as chromatography may be utilized, they are not practical and substantial losses are observed on columns.

The exchange synthesis circumvents these difficulties and is the preferred method for synthesis of the ethylene oxide encapsulated gold cluster. In the exchange synthesis, as shown in Scheme 2, a readily purified alkanethiol encapsulated gold cluster is used as a reagent. The second reagent is the thiol terminated ethylene oxide free ligand. These reagents are dissolved in a common solvent, and an exchange reaction occurs where a gold core bound alkanethiol ligand is displaced by the thiol terminated ethylene oxide free ligand. The preferred alkanethiol gold cluster reagents are those with alkane chain lengths ranging between 5 and 12 while those most preferred are those with a 6 to 8 carbon chain length. The rational for this chain length preference is that the chain length must be sufficiently long enough (>4 carbon atoms) to prevent irreversible cluster aggregation and short enough (<12 carbon atoms) to allow for a rapid exchange reaction. It is also preferred to use an excess of the thiol terminated ethylene oxide free ligand relative to the molar quantity of cluster bound alkanethiol ligand. The molar ratio of the free thiol terminated ethylene oxide ligand to the alkanethiol ligand may range from 1:1 to 10:1, with 2:1 and 3:1 being preferred. After the initial exchange reaction is completed and the purified cluster is isolated, the degree of ligand exchange may be advanced to a value approaching 100% by conducting successive exchange reactions. This may also involve changing the reaction solvent to accommodate the changing solubility characteristics of the cluster. Changing the solvent polarity will enhance the solubility of the gold nanoclusters since the solubility characteristics of the gold nanoclusters change. Examples of solvents that can be used include methylene chloride, toluene, methanol, and closely related organic solvents. When completed, this procedure preserves the size of the original core and bypasses a purification problem encountered when a phase transfer agent is used.

Scheme 2.
Depiction of two successive exchange reactions employed in the synthesis of the series of thiol terminated ethylene oxide oligomer encapsulated gold nanoclusters.
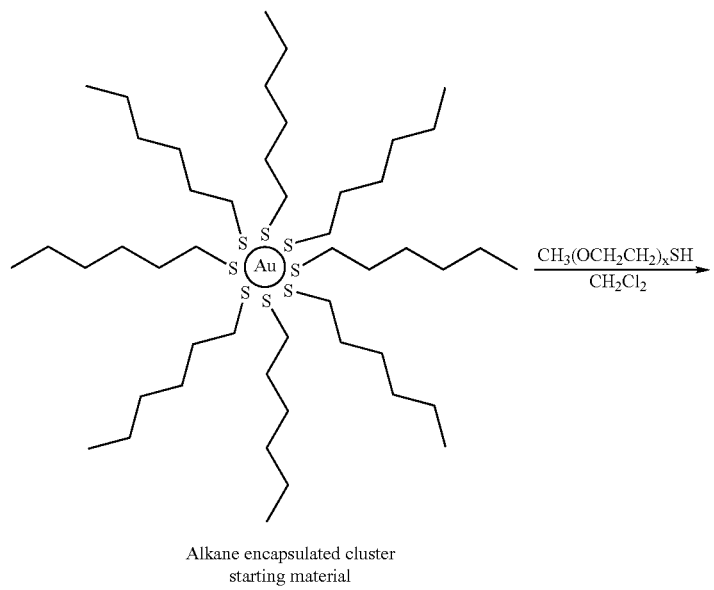
Alkane encapsulated cluster starting material
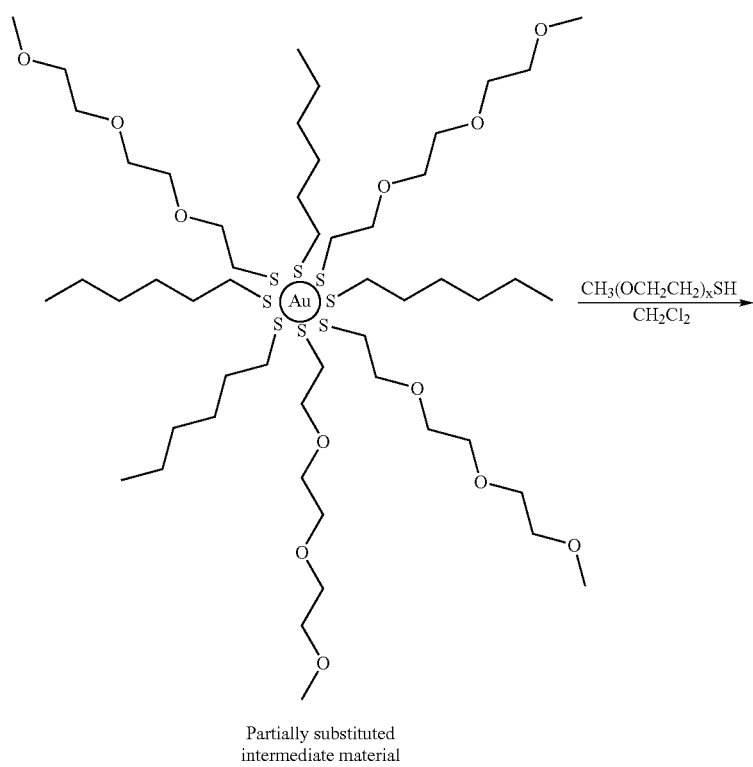
Partially substituted intermediate material -continued

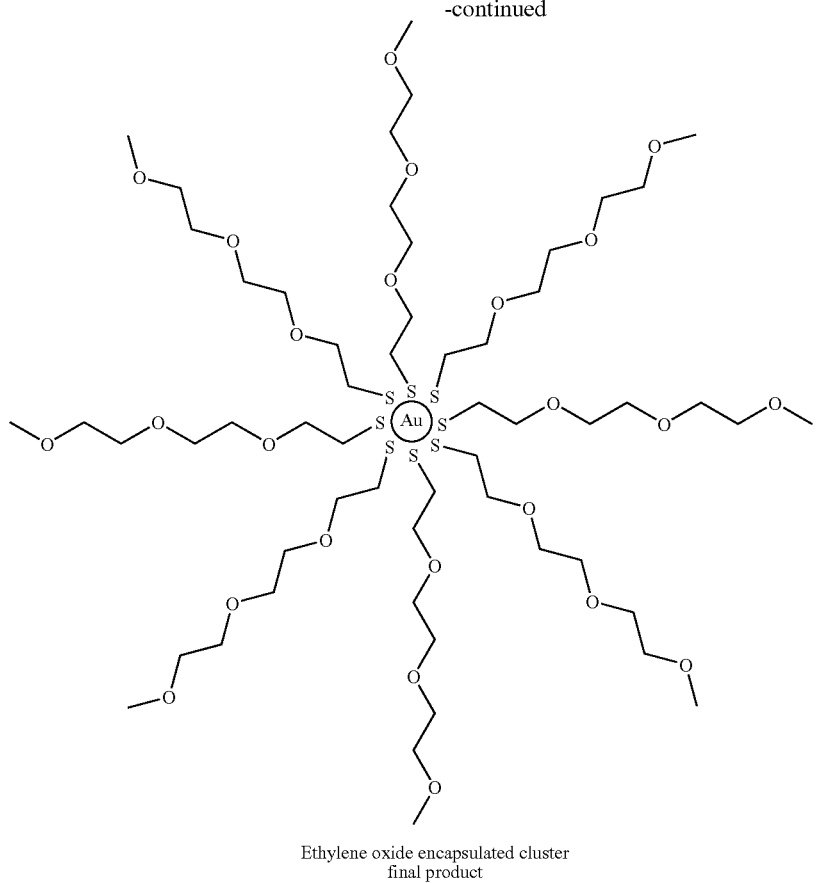

Ethylene oxide encapsulated cluster
final product

EXAMPLE 1

1-(p-Tolylsulfonyl)-3,6-dioxoheptane (3, n=2). A 3-neck 100 ml reaction flask was fitted with a dropping funnel, thermometer and nitrogen inlet and purged with dry nitrogen. Solutions of 2.28 g NaOH (57 mmol) in 12 ml distilled water and 4.806 g 1 (compound 1 from Scheme 1) (40.0 mmol) in 10 ml THF were introduced to the reaction flask and cooled to 3° C. with rapid stirring. A solution of 7.24 g p-toluenesulfonyl chloride (30.0 mmol) in 10 ml THF was transferred to the dropping funnel and added over a 15 min period while maintaining a 3 to 10° C. temperature. The reaction was stirred with 0° C. cooling for 4 hr. The reaction mixture was extracted with 20 ml diethyl ether followed by 3×10 ml ether extractions of the aqueous phase. The combined extracts were back extracted with 50 ml water until neutral (3 extractions) followed by drying ($Na_2SO_4$), rotary evaporation (no heating) and vacuum drying to yield 8.96 g (86%) of 3 (compound 3 from Scheme 1) as a colorless liquid. $^1$H NMR (300 MHz, $CDCl_3$): δ 2.39 (s, 3H, $CH_3$), 3.29 (s, 3H, $OCH_3$), 3.44 (t, 2H, $CH_2$), 3.52 (t, 2H, $CH_2$), 3.82 (t, 2H, $CH_2$), 4.16 (t, 2H, $CH_2$), 7.29 (d, 2H, Ar—H), 7.74 (d, 2H, Ar—H).

1-Mercapto-3,6-dioxoheptane (4, n=2). To a 15 ml reaction flask were added 1.50 g 3 (compound 3 from Scheme 1) (5.47 mmol), 3.0 ml abs. ethanol, 0.42 g thiourea (5.52 mmol) and 0.22 g distilled water. The flask was fitted with a condenser and nitrogen inlet, and the reaction mixture was refluxed for 3 hr. A solution of 0.30 g NaOH (7.5 mmol) in 3.75 ml distilled water was added, and the mixture was refluxed for 3.75 hr. The reaction mixture was concentrated to 2 ml, diluted with 4 ml distilled water, neutralized with conc HCl, extracted 2× with 5 ml $CH_2Cl_2$, dried ($Na_2SO_4$), evaporated to dryness and distilled (75° C./12 mm) to yield 0.52 g (91%) of 4 (compound 4 from Scheme 1) as a colorless liquid. $^1$H NMR (300 MHz, $CDCl_3$): δ 1.48 (t, 1H, SH), 2.59 (quart, 2H, $CH_2$), 3.27 (s, 3H, $CH_3$), 3.44 (m, 2H, $CH_2$), 3.51 (m, 4H, $CH_2$). $^{13}$C NMR (75 MHz, $CDCl_3$): 23.9, 58.8, 69.9, 71.6, 72.7. GC/MS (EI) M+1 137.

EXAMPLE 2

1-(p-Tolylsulfonyl)-3,6,9-trioxodecane (3, n=3). A 3-neck 100 mL reaction flask was fitted with a dropping funnel, thermometer and nitrogen inlet and purged with dry nitrogen. 10.0 g of 1 (compound 1 from Scheme 1) (60.9 mmol) was dissolved in 12 mL of pyridine, added to the reaction flask, and cooled to 0° C. A solution of 11.6 g p-toluenesulfonyl chloride (60.9 mmol) in 12 mL of pyridine was transferred to the dropping funnel, and added dropwise under $N_2$ over a 10 to 15 min period while maintaining the temperature between 0 and 10° C. The reaction was stirred for 2.5 h at 0° C., at which point the flask was sealed and stored at 2° C. overnight. This mixture was then added to 120 mL of ice water and stirred for 1 h. The solution was extracted 3× with 30 mL portions of $CH_2Cl_2$, followed by two washes with 25 mL of 2% HCl aqueous solution. The $CH_2Cl_2$ was then back extracted with 50 mL of $H_2O$, and dried over $MgSO_4$. Rotary evaporation at room temperature yielded 3 (compound 3 from Scheme 1) as a clear liquid, which was used immediately for the preparation of 4 (compound 4 from Scheme 1).

1-Mercapto-3,6,9-trioxodecane (4, n=3). To a 50 mL reaction flask was added 3 (compound 3 from Scheme 1) dissolved in 10 mL of EtOH and 4.64 g of thiourea (60.9 mmol) dissolved in 15 mL of $H_2O$. A condenser was attached, and the reactants were refluxed with stirring for 2 h. 2.68 g of NaOH (67.0 mmol) in 10 mL of $H_2O$ was then added, and reflux maintained for 1.5 h. The solution was cooled to room temperature, concentrated, diluted with 20 mL of $H_2O$, and neutralized by dropwise addition of concentrated HCl. The product was extracted from this aqueous solution with three 30 mL portions of $CH_2Cl_2$, which were dried over $MgSO_4$ and evaporated, leaving a yellow oil. This product was purified by vacuum distillation (60° C., 1 torr), producing 3.46 g of 4 (compound 4 from Scheme 1) (32% overall yield). $^1H$ NMR (300 MHz, $CDCl_3$): δ 1.56 (t, 1H, —SH), δ 2.67 (q, 2H, —$CH_2SH$), δ 3.36 (s, 3H, $CH_3$—), δ 3.56 (multiplet, 12H, methylene groups in backbone). $^{13}C\{^1H\}$ NMR (75 MHz, $CDCl_3$): δ 24.2 (s, —$CH_2SH$), δ 59.0 (s, $CH_3$—), δ 70.4 (s, —$OCH_2CH_2$—), δ 70.5 (s, —$OCH_2CH_2$—), δ 72.0 (s, —$OCH_2CH_2$—), δ 72.8 (s, —$OCH_2CH_2$—). FRIR: 2871 $cm^{-1}$ (s), 2549 $cm^{-1}$ (w), 1112 $cm^{-1}$ (s). GC/MS (EI): 181 (M+1).

EXAMPLE 3

1-(p-Tolylsulfonyl)-3,6,9,12-tetraoxotridecane (3, n=4). A 3-neck 100 mL reaction flask was fitted with a dropping funnel, thermometer and nitrogen inlet and purged with dry nitrogen. 3.07 g of 1 (compound 1 from Scheme 1) (14.7 mmol) was dissolved in 3 mL of pyridine, added to the reaction flask, and cooled to 0° C. A solution of 2.81 g p-toluenesulfonyl chloride (14.7 mmol) in 3 mL of pyridine was transferred to the dropping funnel, and added dropwise under $N_2$ over a 10 to 15 min period while maintaining the temperature between 0 and 10° C. The reaction was stirred for 2.5 h at 0° C., at which point the flask was sealed and stored at 2° C. overnight. This mixture was then added to 30 mL of ice water and stirred for 1 h. The solution was extracted 3× with 10 mL portions of $CH_2Cl_2$, followed by two washes with 25 mL of 1% HCl aqueous solution. The $CH_2Cl_2$ was then back extracted 2× with 10 mL of $H_2O$, and dried over $MgSO_4$. Rotary evaporation at room temperature yielded 2.84 g (53%) of 3 as a clear liquid, which was used immediately for the preparation of 4 (compound 4 from Scheme 1).

1-Mercapto-3,6,9,12-tetraoxotridecane (4, n=4). To a 50 mL reaction flask was added 2.84 g (7.8 mmol) of 3 (compound 3 from Scheme 1) dissolved in 5 mL of EtOH and 0.66 g of thiourea (8.6 mmol) dissolved in 5 mL of $H_2O$. A condenser was attached, and the reactants were refluxed with stirring for 3.5 h. 0.34 g of NaOH (8.6 mmol) in 5 mL of $H_2O$ was then added, and reflux maintained for 3.5 h. The solution was cooled to room temperature, concentrated, diluted with 10 mL of $H_2O$, and neutralized by dropwise addition of concentrated HCl. The product was extracted from this aqueous solution with three 10 mL portions of $CH_2Cl_2$, which were dried over $MgSO_4$ and evaporated, leaving a yellow oil. This product was purified by vacuum distillation (85° C., 1 torr), producing 0.68 g of 4 (compound 4 from Scheme 1) (20% overall yield). $^1H$ NMR (300 MHz, $CDCl_3$): δ 1.56 (t, 1H, —SH), δ 2.65 (q, 2H, —$CH_2SH$), δ 3.34 (s, 3H, $CH_3$—), δ 3.52 (multiplet, methylene groups in backbone), δ 3.60 (multiplet, methylene groups in backbone). $^{13}C\{^1H\}$ NMR (75 MHz, $CDCl_3$): δ 24.2 (s, —$CH_2SH$), δ 59.0 (s, $CH_3$—), δ 70.1 (s, —$OCH_2CH_2$—), δ 70.5 (s, —$OCH_2CH_2$—), δ 71.9 (s, —$OCH_2CH_2$—), δ 72.8 (s, —$OCH_2CH_2$—). FTIR: 2872 $cm^{-1}$ (s), 2554 $cm^{-1}$ (w), 1111 $cm^{-1}$ (s). GC/MS (EI): 223 (M-1).

EXAMPLE 4

1-Mercapto-3,6-dioxoheptane encapsulated gold cluster. To a 10 ml flask were added 148.9 mg of an octanethiol encapsulated gold cluster (synthesized from a 1:1 Au:octanethiol molar ratio), 83.4 mg 1-mercapto-3,6,9-trioxodecane and 2.00 g chloroform. This solution was stirred for 22 hr at 23° C. This mixture was concentrated to dryness then evacuated (~1 mm Hg) for 1-2 hr to pump away $HS(CH_2)_7CH_3$ and $HS(CH_2CH_2O)_2CH_3$ free ligands. To this product were added 80.4 mg $HS(CH_2CH_2O)_2CH_3$ and 2.00 g $CHCl_3$. This solution was stirred for 22 hr at 23° C. followed by concentration to dryness and vacuum drying again to remove free ligands. The exchange reaction was repeated a third time with 72.0 mg $HS(CH_2CH_2O)_2CH_3$ and 2.00 g $CHCl_3$ reacted for 22 hr at 23° C., concentrated to dryness, vacuum dried, washed with pentane and again vacuum dried to yield 108 mg product.

EXAMPLE 5

1-Mercapto-3,6,9-trioxodecane encapsulated gold cluster. 0.180 g of a hexanethiol encapsulated gold cluster (synthesized from a 1:1 Au:hexanethiol molar ratio) was added to a 20 mL vial equipped with a stir-bar, and the solid dissolved in 1 to 2 mL of $CH_2Cl_2$ forming a dark solution. 0.165 g of 1-mercapto-3,6,9-trioxodecane (0.92 mmol) was added via pipet, and the solution stirred at room temperature for 7 h. The solvent was evaporated to dryness under vacuum, leaving a dark solid and a few drops of liquid. This solid was redissolved in $CH_2Cl_2$ and an additional 0.165 g of 1-mercapto-3,6,9-trioxodecane added, followed by stirring for 7 h. The solution was evaporated to dryness under vacuum, and the resulting dark solid washed with approximately 25 mL of heptane, broken into several portions. The washed solid was dried under vacuum (~1 mm Hg) for 5 h, yielding 0.151 g of product.

EXAMPLE 6

1-Mercapto-3,6,9,12-tetraoxotridecane encapsulated gold cluster. 0.127 g of a hexanethiol encapsulated gold cluster (synthesized from a 1:1 Au:hexanethiol molar ratio) was added to a 20 mL vial equipped with a stir-bar, and the solid dissolved in 1 to 2 mL of $CH_2Cl_2$ forming a dark solution. 0.136 g of 1-mercapto-3,6,9,12-tetraoxotridecane (0.61 mmol) was added via pipet, and the solution stirred at room temperature for 7 h. The solvent was evaporated to dryness under vacuum, leaving a dark solid and a few drops of liquid. This solid was redissolved in $CH_2Cl_2$ and an additional 0.136 g of 1-mercapto-3,6,9,12-tetraoxotridecane added, followed by stirring for 7.5 h. The solution was evaporated to dryness under vacuum, and the resulting dark solid washed with approximately 40 mL of heptane, broken into four 10 mL portions. The washed solid was dried under vacuum (~1 mm Hg) for 5 h, yielding 0.128 g of product.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

The invention claimed is:

1. A composition of matter comprising a plurality of nanoclusters each composed of a gold core with a diameter of 0.5 to 10 nm and encapsulated by a monolayer of a thiol terminated ethylene oxide oligomer bonded to surface gold atoms of the gold core with sulfur-gold bonds;

wherein the thiol terminated ethylene oxide oligomer comprises the formula;

wherein x is an integer from 1 to 10.

2. The composition of matter of claim 1, wherein x is an integer from 3 to 10.

3. The composition of matter of claim 1, wherein x is 1 or 2.

4. The composition of matter of claim 1, wherein x is 2.

5. The composition of matter of claim 1, wherein x is 3.

6. The composition of matter of claim 1, wherein x is 4.

7. A method of making a gold nanocluster using a thiol terminated ethylene oxide oligomer comprising;
   dissolving an alkanethiol encapsulated gold cluster and the thiol terminated ethylene oxide oligomer in a solvent causing an exchange reaction where a gold core bound alkanethiol ligand is displaced by a thiol terminated ethylene oxide free ligand to form a thiol terminated ethylene oxide oligomer capped gold cluster;
   wherein the thiol terminated ethylene oxide oligomer comprises the formula;

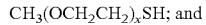

wherein x is an integer from 1 to 10.

8. The method of claim 7 wherein said alkanethiol encapsulated gold cluster has an alkane chain length ranging from 5 to 12 carbon atoms.

9. The method of claim 7 wherein said alkanethiol encapsulated gold cluster has an alkane chain length ranging from 6 to 8 carbon atoms.

10. The method of claim 7 wherein an excess of said thiol terminated ethylene oxide oligomer is used relative to the molar quantity of said alkanethiol encapsulated gold cluster.

11. The method of claim 7 wherein the molar ratio of said alkanethiol ligand to said thiol terminated ethylene oxide ligand ranges from 1:1 to 1:10.

12. The method of claim 7 further comprising conducting successive exchange reactions to increase the degree of ligand exchange.

13. The method of claim 12 further comprising changing solvent polarity to enhance the solubility characteristics of the gold nanoclusters as the solubility characteristics of the gold nanoclusters change.

14. The method of claim 13 wherein said solvent is selected from the group consisting of methylene chloride, toluene, methanol, and mixtures thereof.

* * * * *